(12) United States Patent
Rogozinski et al.

(10) Patent No.: US 9,127,745 B2
(45) Date of Patent: Sep. 8, 2015

(54) ROTATABLE DAMPER

(75) Inventors: Joseph Rogozinski, Ramat-Gan (IL); Gilad Woolf, Kfar-Maimon (IL)

(73) Assignee: SOFTWHEEL, LTD., Tel Aviv (IL)

( * ) Notice: Subject to any disclaimer, the term of this patent is extended or adjusted under 35 U.S.C. 154(b) by 0 days.

(21) Appl. No.: 13/982,111

(22) PCT Filed: Jan. 24, 2012

(86) PCT No.: PCT/IB2012/000100
§ 371 (c)(1),
(2), (4) Date: Jan. 13, 2014

(87) PCT Pub. No.: WO2012/104691
PCT Pub. Date: Aug. 9, 2012

(65) Prior Publication Data
US 2014/0116199 A1   May 1, 2014

(30) Foreign Application Priority Data

Feb. 6, 2011 (IL) .......................................... 211077

(51) Int. Cl.
*F16F 15/16*   (2006.01)
*B60C 5/24*    (2006.01)
*B60C 19/00*   (2006.01)

(52) U.S. Cl.
CPC ................. *F16F 15/161* (2013.01); *B60C 5/24* (2013.01); *B60C 19/00* (2013.01); *Y10T 74/2125* (2015.01)

(58) Field of Classification Search
CPC ....... F16F 15/173; F16F 15/36; F16F 15/366; F16F 15/161
USPC .................. 74/573.1, 573.11, 573.12, 574.4; 123/192.1; 152/331.1, 340.1; 464/66.1, 464/67.1, 68.6, 180
See application file for complete search history.

(56) References Cited

U.S. PATENT DOCUMENTS

| 1,584,679 A | 5/1926 | Stoltz |
| 1,673,056 A | 6/1928 | Stoltz |

(Continued)

FOREIGN PATENT DOCUMENTS

| DE | 235200 | 6/1911 |
| DE | 3222262 A1 | 12/1983 |

(Continued)

OTHER PUBLICATIONS

English Translation of Jun. 16, 2014 Office Action issued in Israeli Patent Application No. 211077.

(Continued)

*Primary Examiner* — Thomas R. Hannon
*Assistant Examiner* — Adam D Rogers
(74) *Attorney, Agent, or Firm* — Clements Bernard PLLC; Christopher L. Bernard; Lawrence A. Baratta, Jr.

(57) ABSTRACT

A rotatable damper (100) comprises a mass (110) fully rotatable around an axis of rotation configured for self-damping a mechanical disturbance. The rotatable mass comprises a fully rotatable structure comprising an outer frame (2100) and an inner frame (2400) bound to rotate with the fully rotatable structure and further movable one relative to the other in at least one axis and a first chamber (3200), disposed between the outer frame and the inner frame, containing a fluid and comprising a first opening in direct communication with a first constriction (3300). The first chamber is readily compressible between a first portion of the outer frame and a second portion of the inner frame when forcibly approached by said mechanical disturbance. The first chamber, when compressed, is configured to expel at least partially the fluid through the first constriction, thereby facilitating damping of the mechanical disturbance.

22 Claims, 11 Drawing Sheets

(56) References Cited

U.S. PATENT DOCUMENTS

| | | | |
|---|---|---|---|
| 1,979,935 A | 11/1934 | Henap | |
| 2,238,410 A | 4/1941 | Capuciati | |
| 3,896,868 A | 7/1975 | Molitor | |
| 4,310,149 A | 1/1982 | Camilleri | |
| 4,465,321 A | 8/1984 | Berg | |
| 6,041,838 A | 3/2000 | Al-Sabah | |
| 6,257,604 B1 | 7/2001 | Laurent et al. | |
| 6,357,770 B1 | 3/2002 | Carpiaux et al. | |
| 6,588,473 B1 * | 7/2003 | Walrond | 152/331.1 |
| 7,699,326 B2 | 4/2010 | Yamada | |
| 8,037,957 B2 | 10/2011 | Laurent | |
| 8,240,689 B2 | 8/2012 | Holt et al. | |
| 2010/0218865 A1 | 9/2010 | Kim | |
| 2013/0312464 A1 * | 11/2013 | Davis | 68/212 |

FOREIGN PATENT DOCUMENTS

| | | | |
|---|---|---|---|
| DE | 102005032537 A1 | | 1/2007 |
| EP | 0432079 A2 | * | 11/1990 |
| EP | 0432079 A2 | | 6/1991 |
| EP | 1029711 A2 | | 2/2000 |
| EP | 1029711 A2 | * | 8/2000 |
| FR | 351455 A | | 7/1905 |
| FR | 464426 A | | 3/1914 |
| FR | 614407 A | | 12/1926 |
| FR | 730768 A | | 8/1932 |
| FR | 1105719 A | | 12/1955 |
| FR | 2795947 A1 | | 1/2001 |
| FR | 2898077 A1 | | 9/2007 |
| GB | 06920 A | | 0/1913 |
| GB | 1549611 | | 8/1979 |
| GB | 2188596 A | | 10/1987 |
| JP | 61207202 A | * | 9/1986 |
| JP | 04368203 A | | 12/1992 |
| WO | 9715461 A1 | | 5/1997 |
| WO | 0176351 A1 | | 10/2001 |
| WO | 2006128291 A1 | | 12/2006 |
| WO | 2009029990 A1 | | 3/2009 |
| WO | WO 2012153170 A1 | * | 11/2012 |

OTHER PUBLICATIONS

Jun. 18, 2012 International Search Report Issued in International Patent Application No. PCT/IB2012/000100.

Aug. 1, 2012 International Search Report issued in International Patent Application No. PCT/IB2012/000530.

Jan. 24, 2013 International Search Report issued in International Patent Application No. PCT/IB2012/001994.

Sep. 22, 2014 International Search Report issued in International Patent Application No. PCT/IB2014/000580.

* cited by examiner

ROTATABLE DAMPER

RELATED APPLICATIONS

This application is a national phase filing under 35 U.S.C. 371 of International Application No. PCT/IB2012/000100, filed on Jan. 24, 2012, and claims the benefit of Israeli Patent Application Serial No. 211077, filed Feb. 6, 2011. The entirety of these applications is hereby incorporated herein by reference for the teachings therein.

FIELD AND BACKGROUND OF THE INVENTION

The present invention, in some embodiments thereof, relates to mechanical dampers and in particular to damping, cushioning and/or shock absorbing mechanisms that are part of a rotator such as a wheel or a rotor.

Rotating masses tend to randomize vibrations due to external forces and impacts from surfaces in contact. One example is the vibratory motion of a wheel when it travels a distance on a non-purely smooth surface. Motorized vehicles commonly include suspension systems in order to protect their chassis or other affiliated parts from early failure as well as to avoid unpleasant conditions for its passengers.

It is custom to attach the suspension means to static parts of the machine or vehicle, usually in direct communication with the axle or with other elements that provide a stable axis of rotation to the rotating mass or rotator. For example, a wheel that travels over a rough surface will transfer axial, vertical and other amplitudes (e.g., impacts and/or vibratory forces) to the axle, which will be at least partially damped and flattened using suspension means that can be located between the axel and the chassis.

It is further custom to implement a set of mechanical springs in the suspension system that will be used to shock absorb and resist impacts and vibrations in several directions, although other mechanism were introduced that are based on transforming the absorbed undesired kinetic energy to other less harmful forms. One of these means is to allow transfer a fluid (such as air or oil) between separate containers through a constriction in a thin channel following amplitude, whereby the transfer of the fluid transforms the absorbed kinetic energy to heat.

There is still a need for more efficient and less expensive dampers and suspension systems for example when the rotating mass is sold separately to the complete product and/or considered a relatively vital and/or expensive part thereof.

SUMMARY OF THE INVENTION

According to an aspect of some embodiments of the present invention there is provided a mass fully rotatable around an axis of rotation configured for self-damping a mechanical disturbance.

The rotatable mass may be any rotatable object including a wheel, a hub, a gear, a planetary revolving element, a rotor, a centrifuge, a driveshaft, a flywheel, a workpiece and a machining tool.

In some embodiments, the rotatable mass includes a fully rotatable structure including an outer frame and an inner frame bound to rotate with the fully rotatable structure and further movable one relative to the other in at least one axis. In some embodiments, the at least one axis is the axis of rotation and/or a radial axis relative to the axis of rotation.

In some embodiments, the rotatable mass further including at least one chamber, disposed between the outer and inner frames, containing a fluid and including a first opening in direct communication with a first constriction. In some embodiments, the first chamber is readily compressible between a first portion of the outer frame and a second portion of the inner frame when forcibly approached by the mechanical disturbance. In some embodiments, the first chamber, when compressed, is configured to expel at least partially the fluid through the first constriction, thereby facilitating damping of the mechanical disturbance.

In some embodiments, the mechanical disturbance is at least one of a force, a moment, an impact, work, power, kinetic energy, potential energy, vibrations and natural frequencies. In some embodiments, an applied force may include a radial component and/or a tangential component relative to the axis of rotation.

In some embodiments, the mechanical disturbance is internally generated by the rotatable mass and/or by a power generating element or a power transmitting element. The mechanical disturbance may alternatively be external to the rotatable mass.

In some embodiments, the outer frame and/or inner frame are at least partially circular. Optionally, the outer frame and/or inner frame are influenced to concentric repositioning after the force ceases. Optionally, the outer frame and/or inner frame are rigid. Optionally, the first portion of the outer frame includes at least one inwardly projected rib and/or outwardly projected rib. Optionally, the at least one inwardly projected rib and/or outwardly projected rib includes a length lesser than a distance between two perpendicularly opposing points on the outer frame and the inner frame, respectively, when in concentric formation. Optionally, the at least one inwardly projected rib and/or outwardly projected rib include a second opening in direct communication with a second constriction.

In some embodiments, there is provided at least one constriction including a narrowing, an orifice, a nozzle, a bottleneck, a chokepoint and/or a valve.

In some embodiments, the chamber is expandable, elastic and/or inflatable. In some embodiments, there are provided at least two substantially similar chambers in direct communication with the first opening. Optionally, the two chambers are configured to maintain a substantially constant volume when the fluid is incompressible. In some embodiments, the fluid includes a liquid, a gas, a gel and/or a viscoelastic material. In some embodiments, the at least two chambers are disposed at opposing ends of the rotatable structure in-between the inner and outer frames. Optionally, at least one channel connecting the at least two chambers and configured to facilitate the direct communication between the second chamber and the first opening. The at least one channel may include a constriction. Optionally, the inner frame includes the at least one channel.

In some embodiments, the rotatable mass including a valve in direct communication with the first opening adapted to allow fluid passage therethrough over a predetermined pressure. The predetermined pressure may be determined according to a minimal chosen pressure difference developed at two ends of the constriction between the at least two chambers. Optionally, the valve is controllable, settable and/or replaceable by an operator.

In a another aspect of some embodiments of the present invention, there is provided an in-wheel suspension apparatus incorporated in a single wheel including at least one pair of fluid-bags interconnectable by a channel, the passage including a constriction sized and configured for damping forces applied to the single wheel.

In some embodiments, the passage includes at least one valve. Optionally, at least one of the at least one valve is normally closed valve adapted to open over a predetermined pressure. The at least one of the at least one valve is unidirectional or bidirectional.

In some embodiments, at least one pair of fluid-bags includes two fluid-bags positioned side-by-side and/or two fluid-bags positioned in opposite directions of the wheel. Optionally, at least one of the at least one pair of fluid-bags is at least partially filled with a fluid.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF THE PREFERRED EMBODIMENTS

Figure 1A:
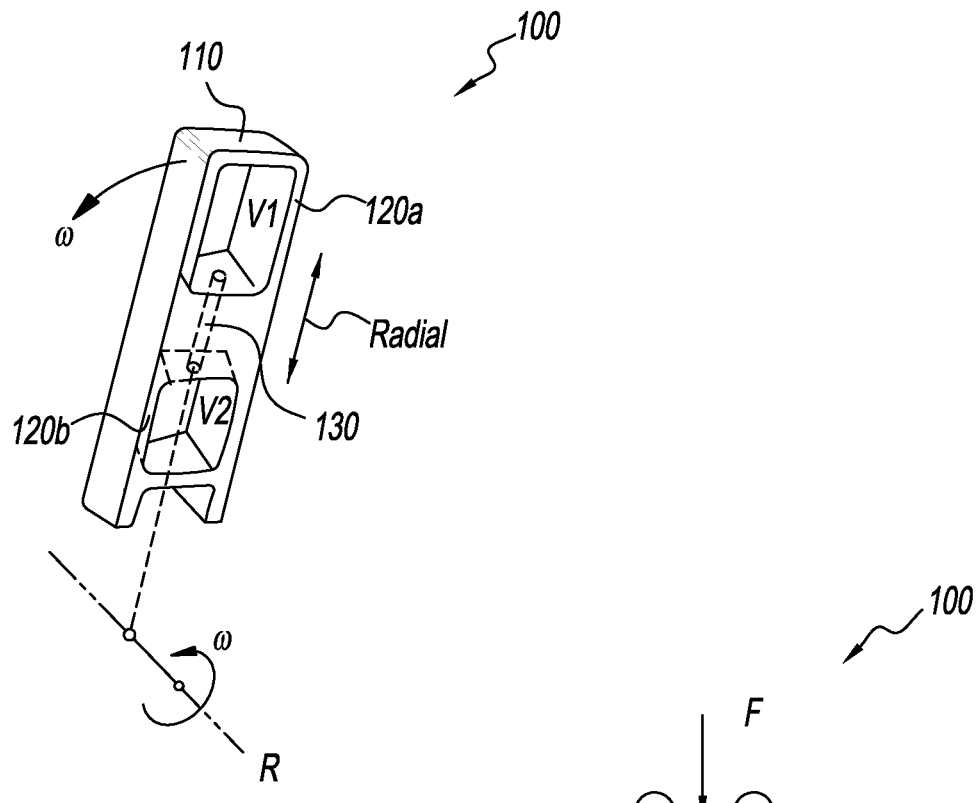
FIGS. 1A-B schematically illustrate isometric and frontal cut views of an exemplary rotatable damper for damping radial forces, in accordance with an embodiment of the present invention.

It is understood that the terminology used herein is used for the purpose of describing particular embodiments only, and is not intended to limit the scope of the invention. It also is be noted that as used herein and in the appended claims, the singular forms "a," "an," and "the" include the plural reference unless the context clearly dictates otherwise. Thus, for example, a reference to "a damper" is a reference to one or more dampers and equivalents thereof known to those skilled in the art.

Unless defined otherwise, all technical and scientific terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals reference similar parts throughout the several views of the drawings.

In some instances, preferred embodiments may be described in the context of exemplary dampers for wheels for ease of description and understanding. However, the invention is not limited to the specifically described devices and systems, and may be adapted to various applications without departing from the overall scope of the invention. For example, devices including concepts described herein may be used for damping forces and impulses for any rotating masses and rotators such as but not limited to: rotors, rotating engine parts, rotating machine parts, rotating machining parts, rotating work-pieces, rotating production and handling means for compounds, materials and/or chemicals, and others.

The present invention, in some embodiments thereof, relates to a system configured for controlling and/or influencing disturbances to a rotatable mass aiming at altering a preferred motion thereof.

An aspect of some embodiments relates to a mass fully rotatable around an axis of rotation and configured for self-damping a mechanical disturbance. In some embodiments, the rotatable mass comprising a fully rotatable structure which includes an outer frame and an inner frame bound to rotate with the structure and further movable one relative to the other in at least one axis, which may be a rotational axis (e.g., the axis of rotation of the rotatable mass) and/or any radial or transverse axis (e.g., with respect to the axis of rotation). In some embodiments, the rotatable mass further comprises at least one chamber, optionally resilient chamber, which is disposed between the outer and inner frames and containing a fluid. Optionally, the at least one chamber incorporates at least one opening that is in direct communication with a constriction. In some embodiments, at least one chamber is readily compressible between a first portion of the outer frame and a second portion of the inner frame when forcibly approached by the mechanical disturbance. In some embodiments, the at least one chamber, when compressed, is configured to expel fluid through a constriction, thereby facilitating damping of the mechanical disturbance.

An aspect of some embodiments of the present invention relates to a system including a plurality of elements, interconnected or independent, each aims at controlling and/or influencing different types and/or directions of mechanical disturbances and in some embodiments may include at least one of radial forces damping means, radial forces cushioning means and tangential forces damping means.

In some embodiments, the system includes a rotatable mass, optionally a fully rotatable mass such as a wheel that includes inner and outer frames, which are subject to rotate with the rotatable mass once rotating, but further allow a limited relative motion one with respect to the other. Such a relative motion is accomplished by at least one pair of resilient interconnected chambers located in-between and connecting the inner and the outer frames, and is subject to compressive stresses when portions of the inner and outer frames approaches one another due to a force or other mechanical disturbance applied to and/or generated in the rotatable mass. In some embodiments, the pair of chambers is at least partially filled with a fluid, optionally an incompressible fluid. In some embodiments, the pair of chambers maintains a substantially constant overall volume, at least when filled with incompressible fluid, so that when one chamber is forcibly compressed to a smaller volume, the other chamber will expand accordingly. In some embodiments, the pair of chambers includes at least one passage incorporating a constriction which induces a pressure differential when a fluid transfers therein from a compressed chamber towards an expanded interconnected chamber.

The definition for "rotatable mass" may be interpreted but not limited to any object or structure, either a complete system or a member in a system, which incorporates rotation capabilities around an axis of rotation. Rotation may be partial and/or limited but preferably the rotatable mass is fully rotatable, such as a wheel, a rotor or other fully rotatable objects.

The definition for "axis of rotation" may be interpreted but not limited to any static, dynamic, constant or temporary axis around which the rotatable mass rotates capable of rotating. Axis of rotation may be in any direction with respect to a plane of the rotatable mass, and may pass through any point on that plane, either on or distant to rotatable mass.

The definition for "mechanical disturbance" may be interpreted but not limited to any type of energy output/product that promotes offset from a nominal or requested state of the system (e.g., the rotatable mass). Such energy output (including power or work output) may include at least one of forces, shocks, moments, impulses, stresses including but not limited to vibratory and other oscillatory stresses, thrust, drag, gravity, centrifugal force, centripetal force and others, whether if generated externally or internally to the rotatable mass. Some mechanical disturbances, such as forces, may be radial or tangential, and/or include radial and tangential components with respect to the axis of rotation of the rotating mass.

The definition for "radial forces" may be interpreted as forces which are substantially directed and/or include a component directed towards (or away from) the axis of rotation. "Tangential forces" or "angular forces" may be interpreted herein as forces which are substantially perpendicular and/or include a component that is perpendicular (or tangent) with respect to the axis of rotation, and may be considered as having the same direction or negative direction as the linear velocity of the immediate point-of-contact with the rotating mass.

The definition for "damping" may be interpreted as to absorbing and/or transforming of energy, such as kinetic energy, produced by impact of forces, to other forms of energy, and most notably to heat. A damper, which may also be coined as shock absorber or dashpot, may be considered as a mechanical device designed to restrain or smooth out shock impulses and/or vibrations, and dissipate kinetic energy. Damping may be relevant to shocks and/or to vibrations. Damping may be any type of controlling, changing, allocating, dissipating and/or containing kinetic and/or potential energy gained or absorbed and/or to any lessening or restraining of such effect to the rotating mass, and may include but not be limited to: shock absorbing, suspension, friction and hysteresis of structural materials.

In some embodiments, damping is achieved by employing the principle of fluid friction, for example by passing a portion of fluid volume through a constriction. The term "constriction" may refer to any thin portion, narrowing, orifice, nozzle, and or any other constraint or friction or turbulence encouraging element that the fluid encounters along its flow passage, optionally along a channel between two or more chambers or reservoirs.

The definition of "cushioning" may be interpreted herein as a functionality of a spring element which is configured to store kinetic energy and/or extend the impact duration that may be transferred to a frame connected to the rotating mass, however is substantially less effective or totally incapable of absorbing and/or dissipating the kinetic energy as in damping.

Radial Forces Damping

Figure 1B:
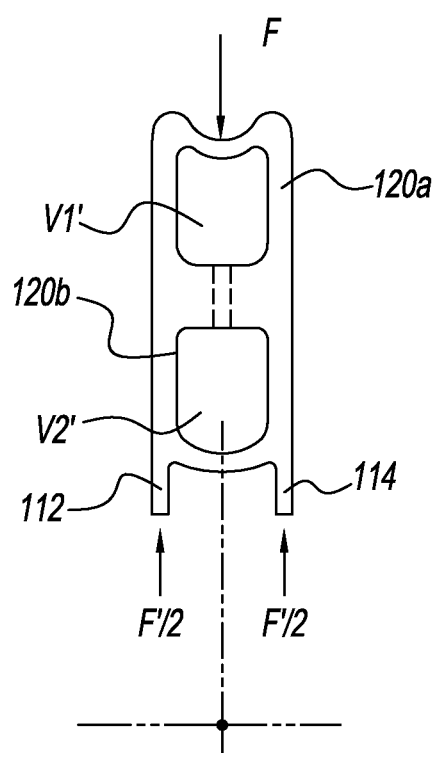

Referring now to the drawings, FIGS. 1A-B schematically illustrate isometric and frontal cut views of a rotational damper 100 rotating around axis of rotation R and configured for damping radial forces, in accordance with an embodiment of the present invention.

Damper 100 includes, is part of, and/or is combined in a rotating mass 110 suggested herein as resembling a rectangular or cuboidal shaped element for illustrative purposes. Damper 100 includes at least two internal chambers or containers 120a and 120b that are directly connected with a passage 130 and are filled, partially or completely, with volumes V1 and V2, respectively, of a fluid. The fluid may be gaseous, liquid or any combination thereof. The fluid may be incompressible, such as water or oil, or may be compressible such as air. In some embodiments, total fluid volume (e.g., a volume that is equal or less than the summation of V1, V2 and the volume entrapped by passage 130) is maintained substantially constant, optionally by providing means for sealing damper 100 for avoiding any fluid leakage, at least an uncontrolled one. In some instances, it may be preferred to use incompressible fluid such as water or oil.

In some embodiments, damper 100 and/or any of chambers 120a and 120b includes a flexible, optionally elastic, portion allowing a change in shape and/or internal volume under exerted disturbances, which are optionally over a minimal, optionally predetermined, value.

In some embodiments, damper 100 is rotated around a rotation axis R which may be static or in-motion relatively to a fixed coordinate system. Axis R may be in any position with respect to damper 100 and/or rotating mass 110, and may or may not pass through or originate from a center (such as a center of curvature, mass and/or gravity) thereof.

In FIG. 1A, damper 100 is shown as having a constant angular velocity ☐ that may be equal or greater than 0, and absent of any substantial radial forces exerted thereupon. Damper 100 may be considered as a pneumatic or hydraulic shock absorber although it may include mechanical springs and/or composite damping elements.

In some embodiments, damper 100 is set and/or capable of damping, at least partially, the effect of a radial force to rotating mass 110 and/or to any construction connected to it (not shown). In FIG. 1B, damper 100 is shown when a radial force F is applied towards chamber 120a. Damper 100 and/or rotating mass 110 is hitched or constraint by lateral extensions 112 and 114, so force F is resisted by accumulated force F' (in this example, an accumulation of two force components of F'/2 originated at lateral extensions 112 and 114) having an opposite direction and/or magnitude equal or less than F. This way, the applied forces will develop compressive stresses to at least part of damper 100 structure.

In some embodiments, rotating mass 110 substantially maintains its overall volume when force F is applied, though optionally it is deformed temporarily and/or permanently. In some embodiments, when force F is applied, containers 120a and 120b are changeable in volume although, optionally, substantially maintaining a constant overall volume. For example, if a force F is applied directly towards container 120a, the latter will lessen in volume while container 120b volume will equally enlarge due to the extra fluid volume passing through passage 130. In some embodiments, damper 100 is elastic and/or deformable or includes elastic and/or deformable parts and/or portions, so that under the applied compressive stresses damper 100 will deform and chamber 120a will decrease in volume from V1 to V1' that is smaller than volume V1 by ΔV. In some embodiments, the change in camber 120a volume causes an affected change in chamber 120b volume, enlarging it from volume V2 to volume V2' which substantially equals V2+ΔV. Such changes in both chambers is caused by a flow of fluid, optionally of volume ΔV (at least when the fluid is incompressible), from chamber 120a to chamber 120b through passage 130.

In some embodiments, when force F is dismissed and/or changes, the reaction of damper 100 will change accordingly, in an effort to substantially regain its nominal and/or previous properties.

In some embodiments, a damping effect is achieved by the fluid flow through passage 130. Passage 130 may be considered a narrow tunnel or include a constriction such as a narrowing, constriction and/or valve.

In some embodiments, an operator or manufacturer may control the damping magnitude by choosing specific fluid type and/or viscosity, working temperature, size and/or shape of the constriction and/or elasticity of damper 100 or chambers 120a and 120b.

Figure 2A:
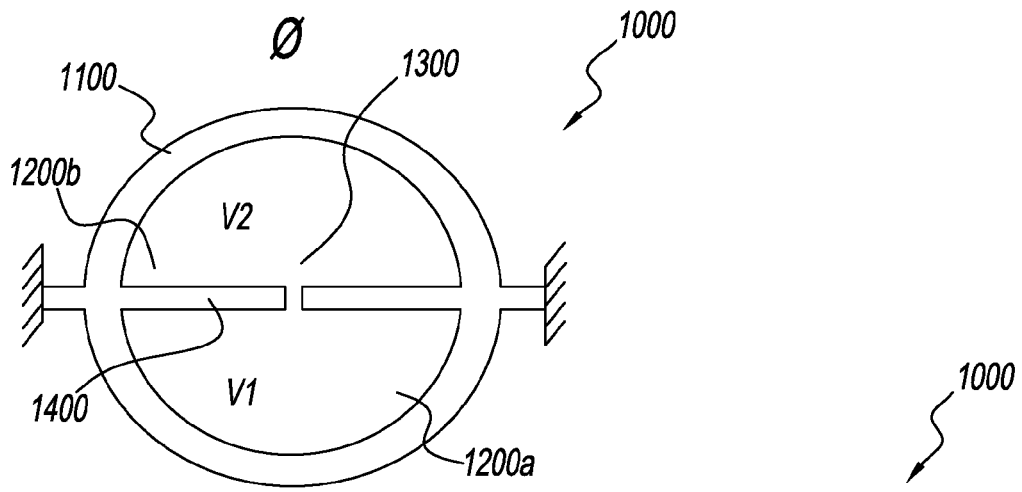
FIGS. 2A-B schematically illustrate frontal cut views of an exemplary circular rotatable damper, in accordance with an embodiment of the present invention.
Figure 2B:
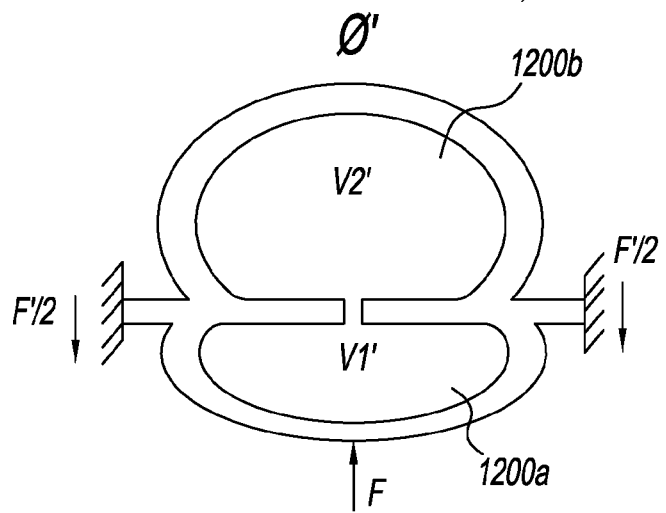

Reference is now made to FIGS. 2A-B which schematically illustrate frontal cut views of a tubular rotatable damper 1000, in accordance with an embodiment of the present invention. In some embodiments, damper 1000 is constrained to and/or embedded in a rotatable mass (not shown). In some embodiments, damper 1000 comprising a body 1100 incorporating two chambers: a first chamber 1200a filled with fluid with volume V1 and a second chamber 1200b filled with fluid with volume V2; the two chambers are divided with a barrier 1400 having an constriction 1300; the barrier includes two extensions at both ends that are constrained to a rotating mass (not shown). Optionally, damper 1000 is substantially symmetric and/or volumes V1 and V2 are substantially equal. Optionally, damper 1000 is rotatable around an axis of rotation (not shown) that is optionally perpendicular to the cut view plane.

In FIG. 2A damper 1000 is at a first instance Ø, while rotating, where it is under no significant external stresses, hence, optionally, it substantially maintains nominal, optionally symmetric, shape, where chambers 1200a and 1200b having volumes V1 and V2, respectively. In FIG. 2B, damper 1000 is at a second instance Ø' during rotation, where an external radial force F is inwardly applied to chamber 1200a towards the center of rotation. In some embodiments, a resistive force F' is developed at damper's constraining areas as two equal components F'/2. In some embodiments, a total resistive force F' is substantially equal and in an opposite direction to force F. In some embodiments, damper body 1100 is substantially flexible and/or elastic while barrier 1400 is optionally substantially rigid. The compressive effect of applied forces F and F' changes chambers volumes V1 and V2 to V1' and V2', respectively (V2'>V1'), thereby promoting fluid flow from chamber 1200a to chamber 1200b through constriction 1300.

Constriction 1300 may be a narrowing, an orifice or valve, and may be passively opened, or actively controlled, automatically or per-demand. In such a way, the absorbed energy is dissipated and/or changes to heat, potential energy, kinetic energy and any combination thereof. In some embodiments, damper 1000 does not include moving parts (in the meaning of solid parts and not fluids), such as a piston. Alternatively, damper 1000 includes at least one moving part.

Radial Forces Cushioning

In some embodiments, a system of the present invention is or includes a member configured to function as a cushioning or spring element. The system may include a mechanical (e.g., coil) spring and/or a "fluid bag", such as a resilient member comprising a sealed flexible chamber that is filled with a fluid, optionally liquid or gaseous (e.g., an "air bag"). Fluid bag cushioning for a rotation mass, such as a wheel-to-axle air-bag cushion, is known and was described in some prior publications, such as German patent number DE3222262 and PCT application number published as WO 97/15461, the disclosures of which are fully incorporated herein by reference.

In some embodiments, at least one cushioning member is applied to accommodate disturbances (e.g., forces) from a plurality of directions with respect to axis of rotation.

In instances that the rotating mass is coupled at its axis of rotation to a structure, such as in the case of a wheel coupled to a vehicle chassis via an axle, the cushioning member may be used to soften blows and vibration amplitudes that are traveling from the rotating mass to the structure. Such "softening" may be achieved by the spring function to extend the impact duration at the expense of the transferred magnitude of force.

In some embodiments, a system of the present invention, such as damper 100 or damper 1000, can be configured or adapted to include cushioning abilities. In some embodiments, cushioning function is achieved by introducing a controllable and/or preset valvular means. In some embodiments, an introduced valve in direct communication with a fluid passage and/or a fluid flow constriction is settable or preset to open (or close) at, below or over a chosen value, optionally a chosen predetermined value. Optionally, said value is a predetermined pressure.

Figure 3:
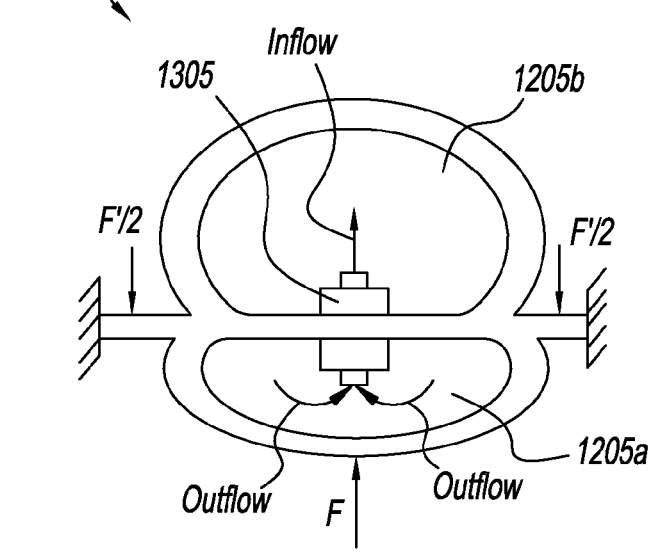
FIG. 3 schematically illustrates a frontal cut view of an exemplary circular rotatable damper comprising an exemplary valve unit, in accordance with an embodiment of the present invention.

Reference is now made to FIG. 3 illustrating a compressed state of a circular rotational damper 1005, that is similar to damper 1000 but includes a preset valve unit 1305 further to or instead of constriction 1300. The illustrated state shows valve unit 1305 in a transitional phase once compressive forces are applied, in which fluid is flowing from a compressed chamber 1205a (denoted as "outflow") to an expanded chamber 1205b (denoted as "inflow") through valve unit 1305.

Figure 4A:
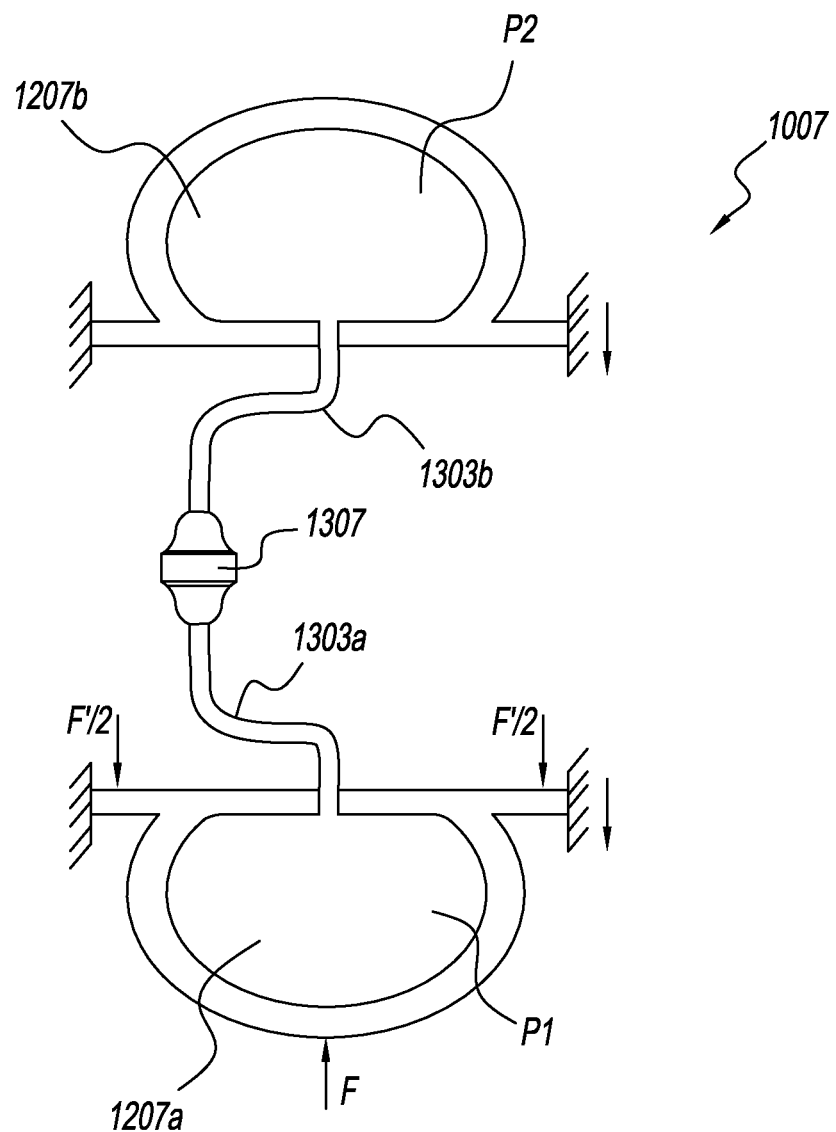
FIGS. 4A-B schematically illustrate frontal cut views of an exemplary rotatable damper having remotely positioned chambers and exemplary valve unit, in accordance with an embodiment of the present invention.

In FIG. 4A, a damper 1007 is schematically illustrated as having remote flexible chambers 1207a and 1207b selectively interconnected via a fluid passage that comprises a preset valve unit 1307, a flow line 1303a connecting chamber 1207a with valve unit 1307 and a flow line 1303b connecting chamber 1207b with valve unit 1307. Valve unit 1307 (and optionally valve unit 1305) may include at least one valve, optionally a pressure relief valve, either unidirectional or bidirectional, which will resist opening under certain, optionally settable or preset, pressure limit. The valve may be of any type and may include any combination of spring element, optionally connected to a movable mass, mechanical, pneumatic and/or hydraulic, and/or elastic deformable/extendable/repositionable elements such as elastic valvular lips.

Figure 4B:
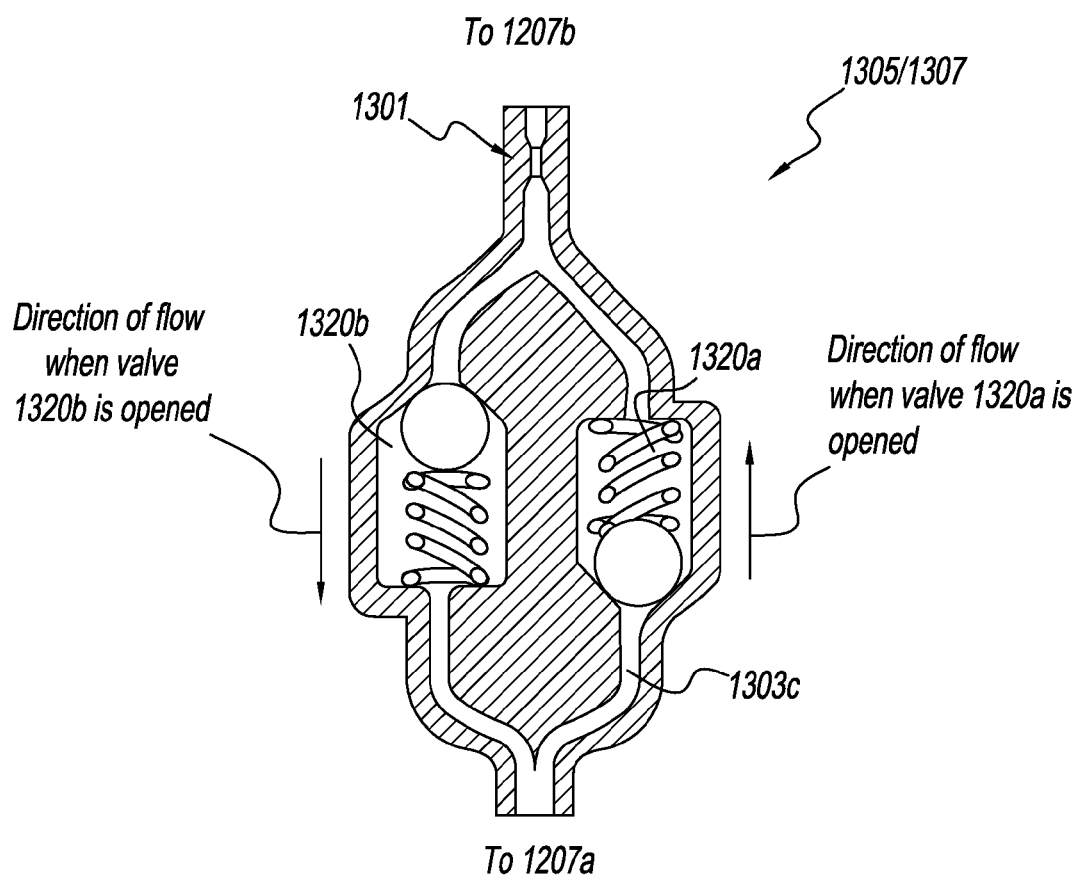

FIG. 4B shows a frontal cut view of an exemplary valve unit that may be any of valve units 1305 and 1307, comprising a bifurcated fluid channel 1303c that splits into two branches that reunite after passing through two appositively directed unidirectional valves, respectively. The valve unit further includes a constriction 1301 along the passage of channel 1303c intended for damping out forces as previously described. As exemplary shown, a first branch incorporates a unidirectional valve 1320a that precludes fluid flow from chamber 1207b to chamber 1207a but may open and allow fluid flow in opposite direction, whereas a second branch incorporates a unidirectional valve 1320b that precludes fluid flow from chamber 1207a to 1207b but may open and allow fluid flow in opposite direction. In some embodiments, at least one of valves 1320a and 1320b opens in a single direction only under pressure differences that are over a predetermined value. As exemplary shown, valves 1320a and 1320b include spring-mass mechanisms, incorporating a coil spring and a moving seal member, having properties such that a minimal pressure is needed to relocate the seal member against spring resistance to a certain minimal travel, thereby allowing fluid flow therethrough. Fluid may be liquid or gaseous.

Referring back to FIG. 4A, in view of the valve unit description of FIG. 4B, the illustrated state shows valve unit 1307 in a close state where chamber 1207a is compressed with internal pressure of P1, whereas chamber 1207b is at nominal state with internal pressure of P2 (wherein P1>P2 and P1=P2+ΔP). As illustrated, the valve unit is closed (valve 1320a denies flow), since that ΔP is smaller than a predetermined preset opening pressure difference ΔP'. In some embodiments, as long as valve unit 1307 remains closed, chamber 1207a will function as a cushioning and non-damping element with respect to a radial force such as force F. In some embodiments, when the pressure difference exceeds ΔP' (such as when P2 decreases and/or forces F and F' increases), valve 1320a will relocate to an open position therefore valve unit 1307 will allow flow travel from chamber 1207a to 1207b at least until an optional change in chamber 1207b either in volume and/or in internal pressure to greater values.

Angular Forces Damping

Figure 5A:
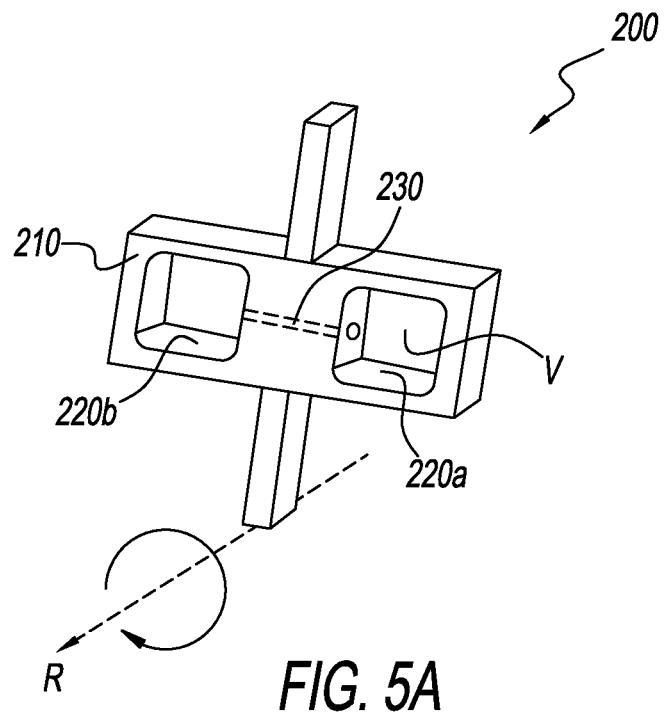
FIGS. 5A-B schematically illustrate isometric views of an exemplary rotatable damper for damping angular disturbances, in accordance with an embodiment of the present invention.
Figure 5B:
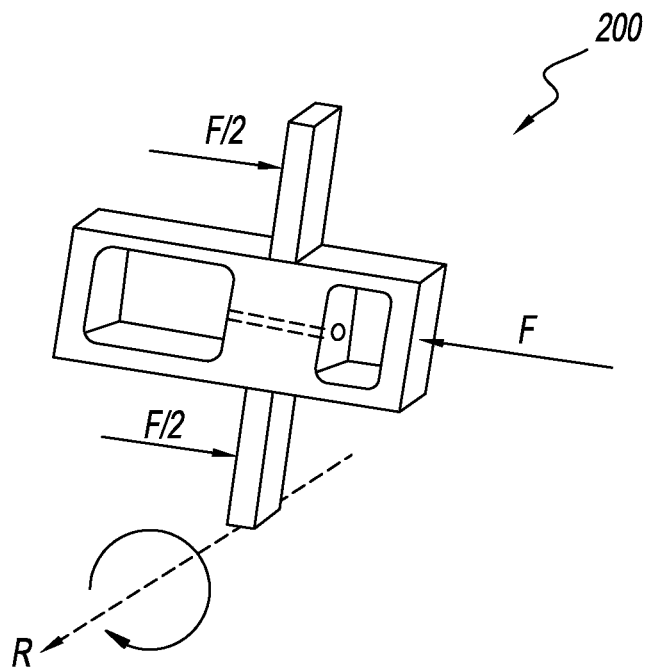

Reference is now made to FIGS. 5A-B which schematically illustrate isometric views in two distinct situations of a rotating damper 200 configured for damping angular forces, when rotating around axis of rotation R, in accordance with an embodiment of the present invention. Damper 200 includes a damper body 210 suggested herein for illustrative purposes only as having a mainly rectangular or cuboidal shaped element, with optional side extensions that are constrained to a rotating mass (not shown). Damper 200 further includes at least two internal chambers or containers 220a and 220b, that are flexible and readily expandable and/or compressible, that are directly connected with a passage 230 and filled, partially or completely, with a volume V of a fluid. The fluid may be gaseous, liquid or any combination thereof. The fluid may be incompressible, such as water or oil, or may be compressible such as air. In some embodiments, fluid volume is maintained substantially constant, optionally by providing means for sealing damper 200 for avoiding fluid leakage, at least an uncontrolled one.

In some embodiments, damper 200 is rotated around a rotation axis R which may be static or in-motion relatively to a fixed coordinate system. Axis R may be in any relation with respect to damper 200 and/or the rotating mass, and may or may not pass through or originate from a point of a perpendicular extension or part thereof.

In FIG. 5A, damper 200 is shown in rotational mode under no external influence such as of external forces, while in FIG. 5B damper 200 is under compressive stresses between applied force F, which is perpendicular to axis R (i.e., an angular/tangential force), and counter resistive force components (for example, two components each having a magnitude of F/2) developed in the constraint extensions of damper body 210. It should be noted, that the illustrated applied forces scheme is schematic and other schemes may apply.

In some embodiments, damper 200 is set and/or capable of damping, at least partially, the kinetic energy created by the work of force F. In some embodiments, a damping effect is achieved by a portion of fluid volume V passing through passage 230 correlative to the absorbed kinetic energy. Passage 230 may be considered a narrow tunnel, constriction and/or valve, and may be passively opened, or actively controlled, automatically or per-demand. In such a way, the absorbed energy is dissipated and/or changes to heat, potential energy, kinetic energy and any combination thereof. In some embodiments, damper 200 does not include moving parts (in the meaning of solid parts and not fluids), such as a piston. Alternatively, damper 200 includes at least one moving part.

In some embodiments, damper 200 is elastic and/or deformable or includes elastic and/or deformable parts and/or portions. In some embodiments, when force F is applied, a counter resistive force is developed at an opposite rigid part of damper 200, due to its constraint to the rotating mass, thereby compressing flexible parts of the damper and/or rotating mass located in-between, in a way that changes volumes of containers 220a and 220b while, optionally, substantially maintaining a constant overall volume. For example, and as shown in FIG. 5B, when force F is applied directly towards container 220a, the latter decreases in volume while container 220b volume equally enlarges due to the added fluid volume passing through passage 230.

In some embodiments, when force F is dismissed and/or changes, the reaction of damper 200 will change accordingly, in an effort to substantially regain its nominal and/or previous properties.

Exemplary Rotational Dampers

In some embodiments, at least three and optionally at least four interconnected chambers are included in a rotating damper in such a way that radial forces may be damped when directed at any point along the damper periphery.

Figures 6A, 6B:
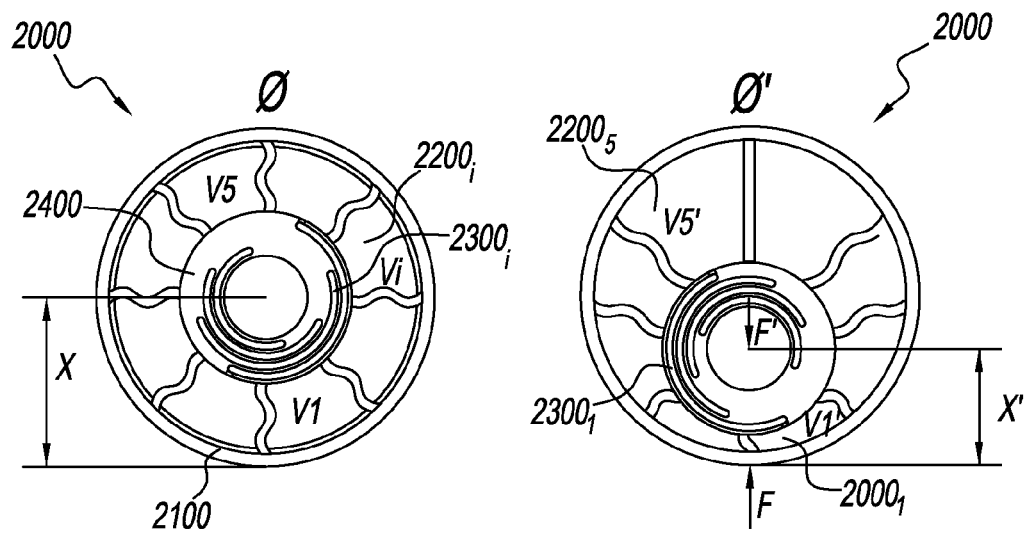
FIGS. 6A-C schematically illustrate frontal cut views and an isometric cut view, respectively, of a first exemplary rotatable damper, in accordance with some embodiments of the present invention.

Reference is now made to FIGS. 6A-B which schematically illustrate frontal cut views of an exemplary rotatable damper 2000, in accordance with some embodiments of the present invention. Damper 2000 includes a plurality of chambers $2200_i$ (eight chambers are shown in FIGS. 6A-B mainly for illustrative purposes) that are evenly and/or symmetrically distributed between an outer tubular cross-sectioned frame 2100 and an inner tubular cross-sectioned frame 2400. In some embodiments, each chamber $2200_i$ is filled with a volume $V_i$ of fluid. In some embodiments, under no external and/or internal stresses, it may be considered that volumes $V_i$ are substantially equal (as shown in instance Ø in FIG. 4A). In some embodiments, each two opposing chambers (such as chambers $2200_1$ and $2200_5$) are interconnected via a passage $2300_i$ opened to both chambers and traveling through grooved inner frame 2400 (for example, passage $2300_1$ that is marked for illustrative purposes in FIG. 4B connecting chambers $2200_1$ and $2200_5$).

Figure 6C:
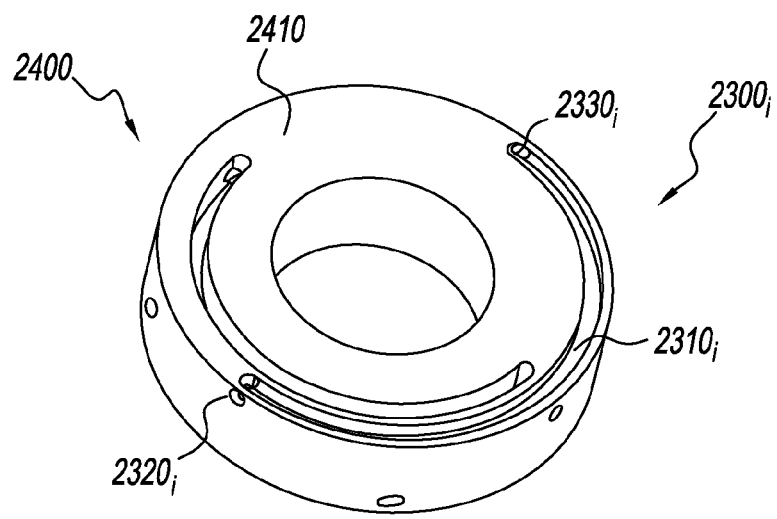

FIG. 6C shows an exemplary axial segment of inner frame 2400. Frame 2400 comprises a tubular body 2410 in which a plurality of passages $2300_i$ are engraved or produced in other methods known to art. In some embodiments, passages $2300_i$ are separated and not connected one with the other. Each passage $2300_i$ includes a channel $2310_i$ that may be curved around frame 2400 axis optionally next to its periphery, optionally about half of a full rotation. In some embodiments, channel $2310_i$ is opened to at least two chambers through pores or constrictions, such as pores $2320_i$ and $2330_i$. In case that the pores do not function as constriction, at least one constriction may be located along any of channels $2310_i$. In some embodiments, the channels demonstrate relatively low hydraulic resistance. Alternatively, especially if no constrictions are present, channels $2310_i$ may facilitate resistance to flow (e.g., imposing a minimal requested pressure gradient along its length).

In some embodiments, chambers $2200_i$ are substantially flexible and deformable (optionally elastically deformable). Optionally, under normal conditions (i.e., when applied forces are not over a maximal value, allowed and/or predetermined), each chamber $2200_i$ is considered as in nominal volume. In some embodiments, when in nominal volume, chamber $2200_i$ are expandable from a minimal unexpanded and/or unfilled volume by evenly filling the chambers with fluid, but the chambers are designed to be further expand, up to a maximal expanded volume, optionally to a maximally allowed volume. Optionally, maximal, minimal and/or nominal chambers' volumes are determined either by mechanical constrained adapted in the damper and/or by manufacturer instruction for use. Optionally, when at least one of chambers $2200_i$ is expanded to a maximal volume, there is at least one, optionally opposing, chamber which is less than the nominal volume and is equal or over the minimal volume. Optionally chambers $2200_i$ are stretchable, optionally inflatable.

In some embodiments, tubular frames 2100 and 2400 are substantially rigid. In some embodiments, one of frames 2100 and 2400 is fixed to a rotating mass (not shown). In some embodiments, frame 2100 is fixed to the rotating mass whereas frame 2400 is configured to rotate with frame 2100 although it can move eccentrically thereof in any direction (one exemplary eccentric position is illustrated in FIG. 6B). In some embodiments, volumetric properties of chambers $2200_i$ and/or elasticity of chambers' walls determine relative positioning of inner tubular frame 2400 with respect to outer rotating tubular frame 2100.

In some embodiments, damper 2000 is designed and configured to damp out disturbances (e.g., forces) only in a specific range, ones that exceeds a minimal value, or ones that do not exceed a maximal value. Optionally, at least one of but not limited to fluid viscosity, overall fluid volume (which determines chambers internal pressures), passage $2300_i$ diameters and/or shapes and/or configurations (where exemplary configuration may include a passive nozzle or an active controllable valve), and chambers $2200_i$ walls elasticity, determines overall damper 2000 configuration and behavior for damping specific forces and force ranges. Optionally, such overall configuration and behavior avoids damping of gravitational force applied to damper 2000 parts, so instance Ø suggested in FIG. 6A may be present when damper 2000 is in relaxed position and/or when it revolves at constant velocities.

In FIG. 6B, a radial force F (encountered by a resistive force F' due to inner frame 2400 constraint to an axis of rotation) has produced relative motion between tubular frames 2100 and 2400, shown in the change between instance Ø and instance Ø', by which the minimal distance between the frames has shortened from distance x at instance Ø to distance x' at instance Ø'. Such relative motion is resisted by redistribution of fluid volumes in-between chambers $2200_i$. In some embodiments, the redistribution is accomplished by compressing/collapsing of some chambers (such as chamber $2200_1$), thereby changing volume V1 at instance Ø to a smaller volume V1' at instance Ø', and stretching of other chambers (such as chamber $2200_5$), thereby changing volume V5 at instance Ø to a greater volume V5' at instance Ø'. Besides resistive forces of stretched chambers (which may or may not be negligible), the damping effect to force F is exercised through the fluid flow through passage $2300_i$ from the first state at instance Ø to the second state at instance Ø'.

In some embodiments, fluid are refrained from travelling in-between chambers (e.g., by keeping passages $2300_i$ sealed), so if stored fluid is compressible, the damping effect translates only to the cushioning/spring effect of sealed, compressible-expandable chambers having elastic walls.

Figure 7A:
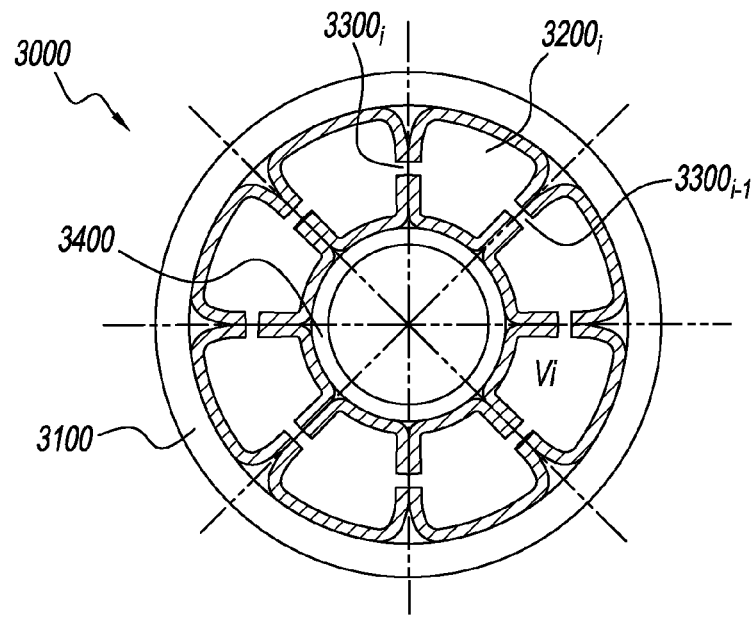
FIGS. 7A-D schematically illustrate frontal cut views and a side cut view, respectively, of a second exemplary rotatable damper, in accordance with some embodiments of the present invention.
Figure 7B:
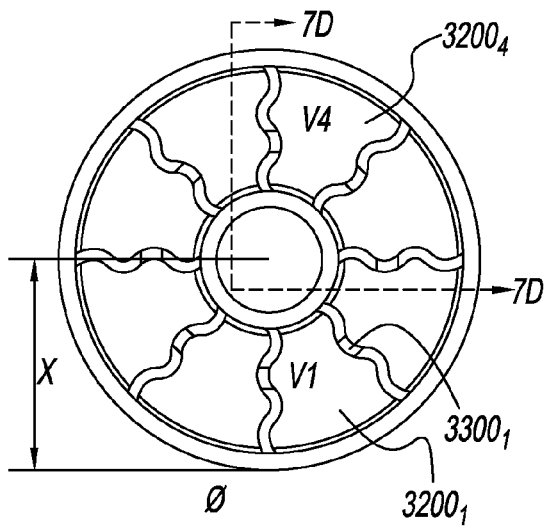
Figure 7C:
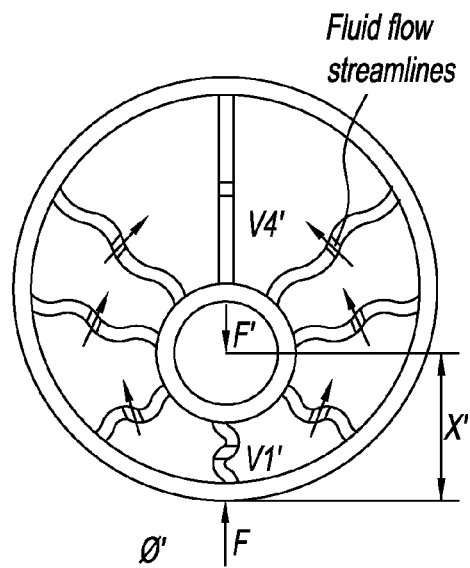

Reference is now made to FIGS. 7A-C which schematically illustrate frontal cut views of an exemplary rotating damper 3000, in accordance with some embodiments of the present invention. Damper 3000 includes a plurality of chambers $3200_i$ (eight chambers are described in FIGS. 7A-C mainly for illustrative purposes) that are evenly and/or symmetrically distributed between an outer tubular frame 3100 and an inner tubular frame 3400. In some embodiments, each chamber $3200_i$ is filled with a volume $V_i$ of fluid. In some embodiments, under no external and/or internal stresses, it may be considered that volumes $V_i$ are substantially equal (as shown in instance Ø in FIG. 7B). In some embodiments, each chamber $3200_i$ includes a right side wall with a constriction $3300_{i-1}$ and a left side wall with a constriction $3300_i$, each constriction is configured for passing fluids therethrough in-between chambers.

In FIG. 7C, one possibility for fluid streaming directions in-between chambers is illustrated, suggesting a virtual instance in which damper 3000 is impacted at the bottom during compression between forces F and F'. In some embodiments, chambers $3200_i$ are substantially flexible and deformable (optionally elastically deformable). Optionally, each chamber $3200_i$ is expandable from a minimal volume (when unfilled) to a nominal volume (when applied forces are not over a maximal value) by the stored fluid, and may be further expanded up to a maximal volume (when forced to fill, for example due to an impact on an opposite chamber), optionally a maximally allowed volume. Optionally, when at least one of chambers $3200_i$ is expanded up to a maximal volume, there is at least one, optionally opposing, chamber which is less than the nominal volume and is equal or over the minimal volume.

Figure 7D:
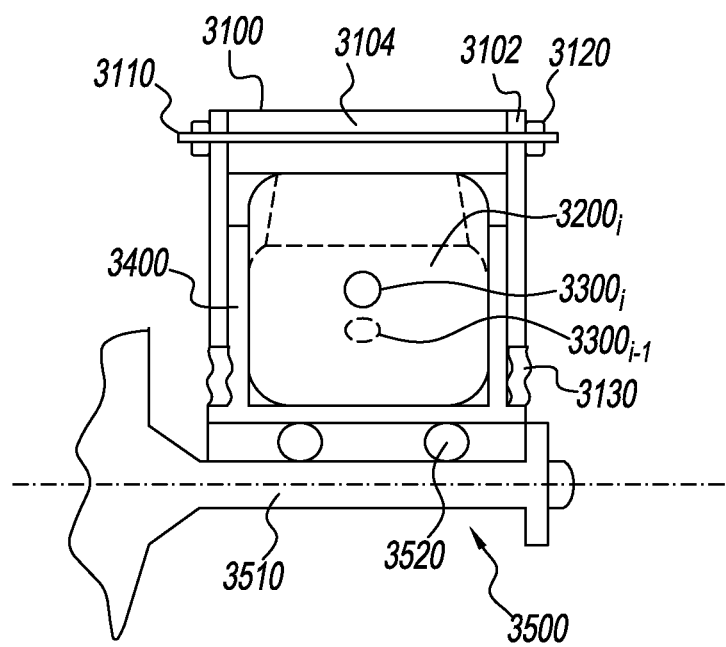

In some embodiments, tubular frames 3100 and 3400 are substantially rigid. In some embodiments, one of frames 3100 and 3400 is fixed to a rotating mass (e.g., a wheel; not shown). In some embodiments, as shown in FIG. 7D, inner frame 3400 is rotationally fixed to an axle 3500 that includes a shaft 3510, optionally via bearings 3520. In some embodiments, outer frame 3100 is fixed to the rotating mass whereas frame 3400 is configured to rotate with frame 3100 although it can move eccentrically thereof in any direction (one exemplary eccentric position is illustrated in FIG. 7C). In some embodiments, volumetric properties of chambers $3200_i$ and/or elasticity of chambers' walls determine relative positioning of inner tubular frame 3400 with respect to outer rotating tubular frame 3100.

In some embodiment, the outer tubular frame 3100 comprises two plates 3102 (with holes at their centers) that are compressed together over inner tubular frame 3400. Optionally, bellows 3130 are used to seal the holes at plates 3102 centers around inner member of inner frame 3400. In some embodiments, compression rods 3110 are fastened with fasteners 3120 to compress and/or lock outer frame 3100 onto inner frame 3400. In some embodiments, a tubular support 3104 is positioned between plates 3102 adjacent their periphery. Optionally, tubular support 3104 is compressible. Optionally, an operator or manufacturer may set the magnitude of compression force by adjusting fasteners 3120 and/or by other means known to art.

In some embodiments, damper 3000 is designed and configured to damp forces only in a specific range, ones that exceeds a minimal value, or ones that do not exceed a maximal value. Optionally, at least one of but not limited to fluid viscosity, overall fluid volume (which determines chambers internal pressures), constriction(s) $3300_i$ diameters and/or shapes and/or configurations (where exemplary configuration may include a passive nozzle or an active controllable valve), and chambers $3200_i$ walls elasticity, determines overall damper 3000 configuration and behavior for damping specific forces and force ranges. Optionally, such overall configuration and behavior avoids damping of gravitational force applied to damper 3000 parts, so instance Ø suggested in FIG. 7B may be present when damper 3000 is in relaxed position and/or when it revolves at constant velocities.

In FIG. 7C, a radial force F has produced relative motion between tubular frames 3100 and 3400, shown in the change between instance Ø and instance Ø', by which the minimal distance between the frames has shortened from distance x at instance Ø to distance x' at instance Ø'. Such relative motion is resisted by redistribution of fluid volumes in-between chambers $3200_i$. In some embodiments, the redistribution is accomplished by compressing/collapsing of some chambers (such as chamber $3200_1$), thereby changing volume V1 at instance Ø to a smaller volume V1' at instance Ø', and stretching of other chambers (such as chamber $3200_4$), thereby changing volume V4 at instance Ø to a greater volume V4' at instance Ø. Besides resistive forces of stretched chambers (which may or may not be negligible), the damping effect to force F is exercised through the fluid flow through at least i–2 constrictions $3300_i$ (in this example, 6 constrictions) from the first equilibrium state at instance Ø to the second equilibrium state at instance Ø'.

Figure 8A:
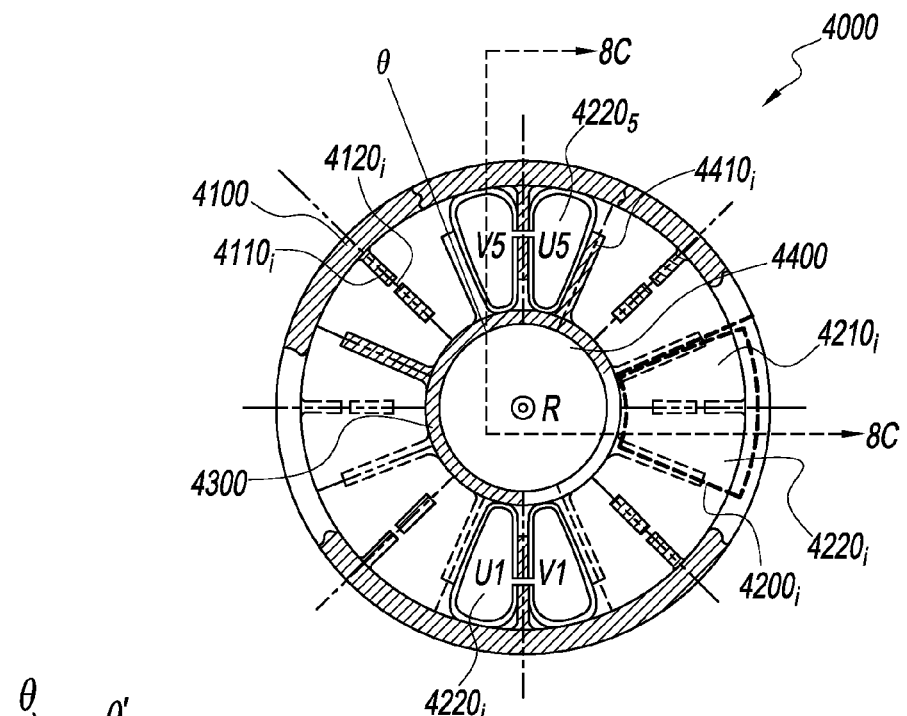
FIGS. 8A-C schematically illustrate frontal cut views and a side cut view, respectively, of an exemplary rotatable damper for damping radial and angular impulses, in accordance with some embodiments of the present invention.
Figure 8B:
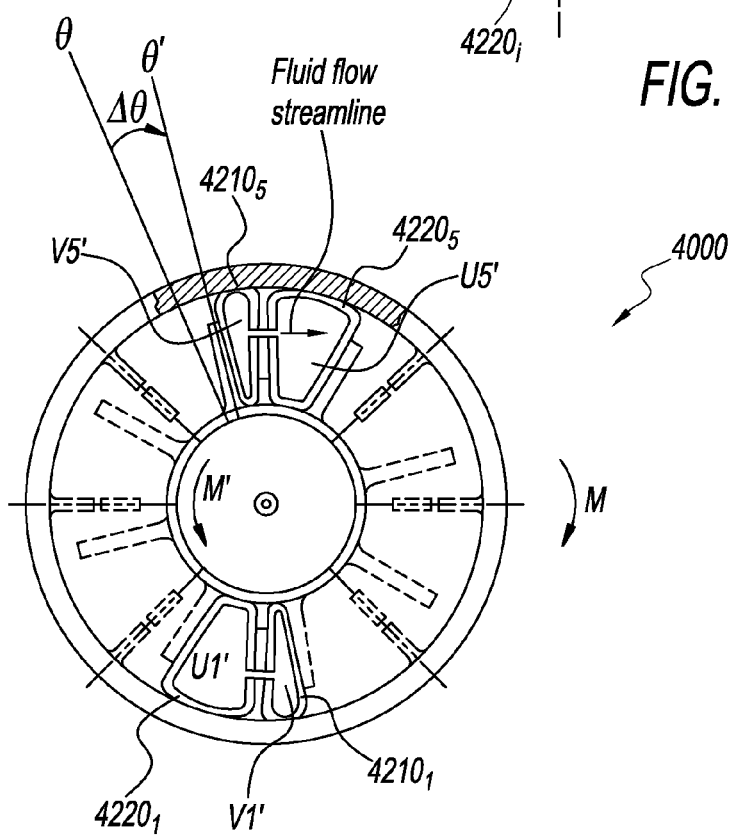

Reference is now made to FIGS. 8A-B which schematically illustrate frontal cut views of an exemplary rotating damper 4000 for damping angular and optionally also radial forces, during rotation of a rotating mass around an axis of rotation R, in accordance with some embodiments of the present invention. In some embodiments, damper 4000 includes a plurality of flexible chambers pairs $4200_i$ (in this exemplary embodiment, "i" is any natural number between 1 and 8) that are evenly and/or symmetrically distributed between an outer tubular cross-sectioned frame 4100 and an inner tubular cross-sectioned frame 4400. In some embodiments, outer frame 4100 includes a plurality of ribs $4110_i$ projected, optionally radially inwardly, and optionally evenly extend, towards damper center. In some embodiments, in nominal configuration such as shown in FIG. 8A (i.e., when no external and/or internal forces are applied to damper 4000, at least not over a predetermined value), ribs $4110_i$ are evenly distant to inner frame 4400 in a predetermined distance. In some embodiments, the predetermined distance is determined according to a travel needed for damping a maximal allowed radial force. In some embodiments, ribs $4110_i$ are evenly distributed around axis of rotation R. In some embodiments, inner frame 4400 includes a plurality of ribs $4410_i$ projected, optionally radially outwardly, away from axis of rotation R, towards outer frame 4100. In some embodiments, ribs $4410_i$ are evenly distant to outer frame 4100 in a predetermined distance. In some embodiments, ribs $4410_i$ length equals ribs $4110_i$ length. In some embodiments, ribs $4410_i$ are evenly distributed around axis R and each rib is evenly located between two adjacent ribs $4110_i$ at nominal configuration (as shown in FIG. 8A). In some embodiments, at least one of ribs $4110_i$ and/or $4410_i$ is angled to a radial axis and/or is shaped in a form other than a substantially straight and thin projection as shown in FIG. 8.

Figure 8C:
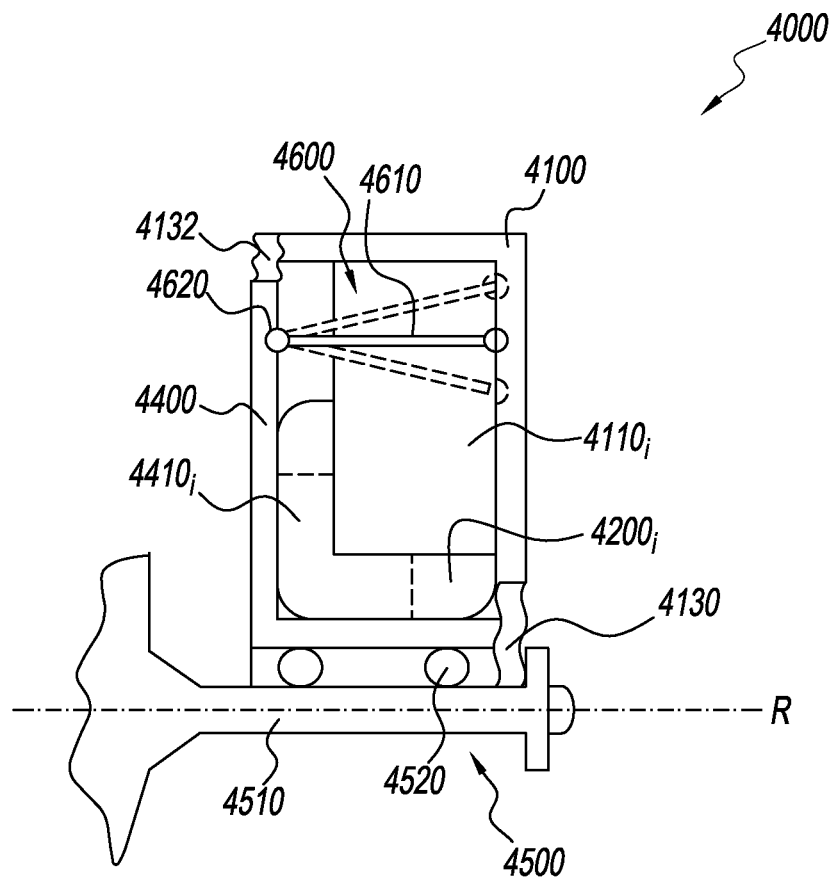

In some embodiments, frames 4100 and 4400 are substantially rigid. In some embodiments, one of frames 4100 and 4400 is fixed to a rotating mass (e.g., a wheel; not shown). In some embodiments, outer frame 4100 is rotationally and axially fixed to the rotating mass whereas inner frame 4400 is rotationally or axially fixed to an axle 4500 that includes a shaft 4510, optionally via bearings 4520 (as illustrated in FIG. 8C). In some embodiments, frame 4400 is rotatable and/or movable in at least two-dimensions with respect to frame 4100 while resisted is any such direction by chambers pairs $4200_i$ which are bounded by ribs $4110_i$ and $4410_i$. Optionally, other means are introduced to resist such motion, for example coil or leaf springs. In some embodiments, volumetric properties of chambers pairs $4200_i$ determine relative positioning of inner tubular frame 4400 with respect to outer rotating tubular frame 4100. Alternatively, in case that damper 4000 is adapted or designed to act only as an angular damper, one of at least two possibilities may apply: (a) that only relative rotational motion is facilitated between frames 4100, for example by extending the ribs to diminish any radial movement, and (b) that both angular and radial relative motion is applicable, but that dumping occurs only in correspondence to a relative rotational motion.

In some embodiments, chambers pairs $4200_i$ are provided in the spaces created between the outer and inner frames and between any two adjacent ribs $4410_i$. In some embodiments, each chamber pair $4200_i$ includes two separate interconnected pockets having volumes $4210_i$ and $4220_i$, filled with fluid, which are optionally equal in nominal or equilibrium state where no forces are involved (as illustrated in FIG. 8A).

In some embodiments, each two opposing chambers pairs are interconnected via a passage $4300_i$ opened to both chambers pairs at two opposing pockets (such as pockets $4220_1$ and $4220_5$) and traveling through grooved inner frame 4400 (as previously described with respect to FIGS. 6A-C). Such interconnectivity allows similar radial damping behavior as that of damper 2000. Alternatively, in case that damper 4000 is adapted or designed to act only as an angular damper, inner frame 4400 does not include interconnecting passages $4300_i$.

In some embodiments, angular damping occurs by angular compression of at least one pocket, such as pocket $4210_5$, resulting from the work of two opposing moments causing relative rotation between frames 4100 and 4400. In some embodiments, each pockets pair 4210$_i$ and 4220$_i$ are interconnected via an orifice 4120$_i$ on rib 4110$_i$, thereby allowing fluid travel therebetween while changing volumes ratios accordingly. Orifices 4120$_i$ are sized and configured for frictional and/or resistive flow which facilitates damping. FIGS. 8A-B illustrate two instances during damper 4000 rotation. In FIG. 8A, damper 4000 is shown in nominal configuration under insignificant or no internal and/or external stresses, or it is under stresses that are smaller than a predetermined value. In FIG. 8B, damper 4000 is shown when an external moment M is applied to periphery of outer frame 4100, and a resistive moment M' that was developed on internal frame 4400 due to resistive behavior of chambers elasticity and/or fluid repositioning. In some embodiments, the compressive moments have caused a relative rotation Δ□ between frames 4100 and 4400, in which a peripheral point has moved from position □ to position □'. In some embodiments, the applied starting moment M and resistive moment M' have compressed pockets 4210$_i$ while causing fluid to travel to pockets 4220$_i$ (as illustrated, for example, by fluid flow stream directing from pocket 4210$_5$ into pocket 4220$_5$) until the volume in formers has decreased and the volume in the latters has equally increased. Referring to the figures, in FIG. 8A, V1 is substantially equal to volume U1, and volume V5 is substantially equal to U5, whereas in FIG. 6B, U5>V5, U1>V1, U5'>U5 and V5'<V5. In some embodiments, the forces developed in each pocket due to tension or compression of elastic walls thereof will tend to restore backward position of frames 4100 and 4400 once external moment M disappears.

The provided example has been focused to damping of tangential forces, although compound forces having significant radial and tangential components may also be fully or partially damped by damper 4000 through fluid travel between each adjacent pocket pairs 4210$_i$ and 4220$_i$ in-parallel to fluid travel between opposing pockets 4220$_i$ (or 4210$_i$). In some embodiments, parameters such as diameters and shapes of orifices 4120$_i$ and length and/or roughness of passages 4300$_i$, or constrictions placed thereinside (not shown), may be set to adjust relative allocation of fluid traveling for the purpose of radial forces damping or for tangential forces damping.

In some embodiments, relative radial movement between frames 4100 and 4400 is bounded by compression and/or expansion resistive forces applied by the chambers. Reference is made to FIG. 8C showing a side cut view in reference to sectioning "8C-8C" made in FIG. 8A. In some embodiments, relative radial motion (and optionally also relative rotation) between frames 4100 and 4400 is further bounded by the use of optional limiters 4600 which allow limited 2D or 3D motion. In some embodiments, limiters 4600 includes a rod 4610 having a determined length and connected at one side to outer frame 4100 and at its other end to inner frame 4400. In some embodiments, at least one of said connections is achieved using a ball hinge 4620 or other mechanical devices allowing free rotating fixations. Additionally or alternatively to shaft 4610, an axial spring may be used (not shown) allowing some degree of limited tension and/or compression. In some embodiments, frames 4100 and 4400 are sealed to form a close compartment, optionally by using seals or bellows 4130 and 4132, which may be non-stretchable or stretchable, elastically or non-elastically, optionally up to a certain limit, thereby allowing relative movements between the frames without failing.

Exemplary Applications

As previously suggested, the rotational damper principle, as described and exemplified herein, may be applied to any rotatable mass. Examples of such rotating mass may be, though not limited to: wheels, wheel hubs, drillers, rotating machine parts, rotors of all types, flywheels (such as in generators), mechanical voltage and current sources, and many others.

Wheels, as devices having a circular frame rotatable on a shaft or axle, may be of any type or shape, including but not limited to wheels designed for vehicles and transportation, for pulleys, and any other devices transferring rotational-to-liner, liner-to-rotational and/or rotational-to-rotational motions. Vehicles, as a conveyance that transports people or objects, may be of any type including but not limited to motorized vehicles (e.g., cars, trucks, trains, airplanes, motorized carts and trolleys, etc.) and/or to unmotorized vehicles (e.g., wheelchairs, bicycles, baby carts and trolleys, supermarket carts, etc.

Figure 9:
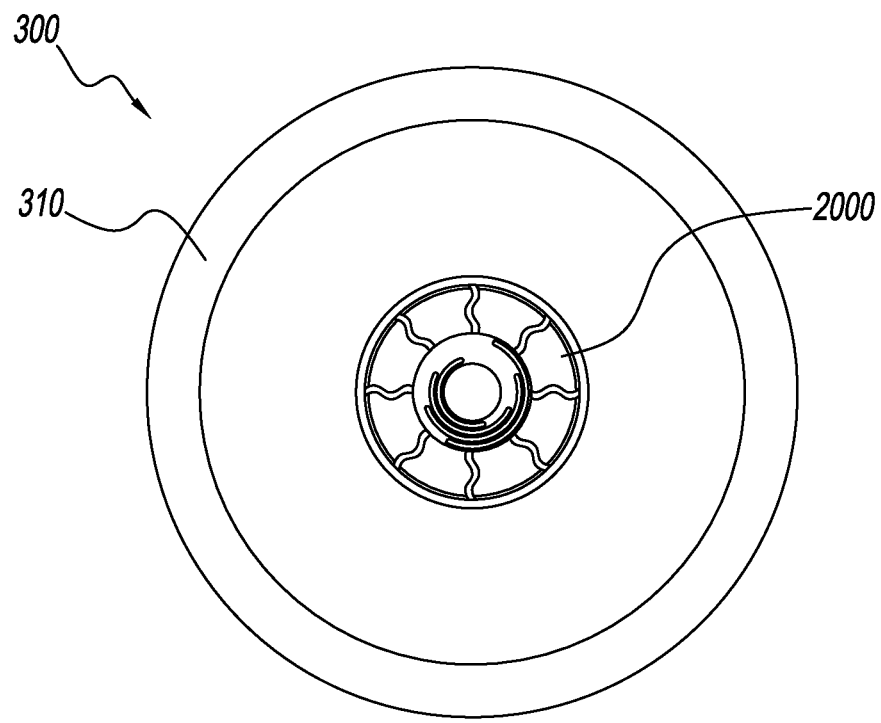
FIG. 9 schematically illustrates a frontal cut view of a wheel comprising a centrally positioned rotatable damper, in accordance with some embodiments of the present invention.
Figure 10:
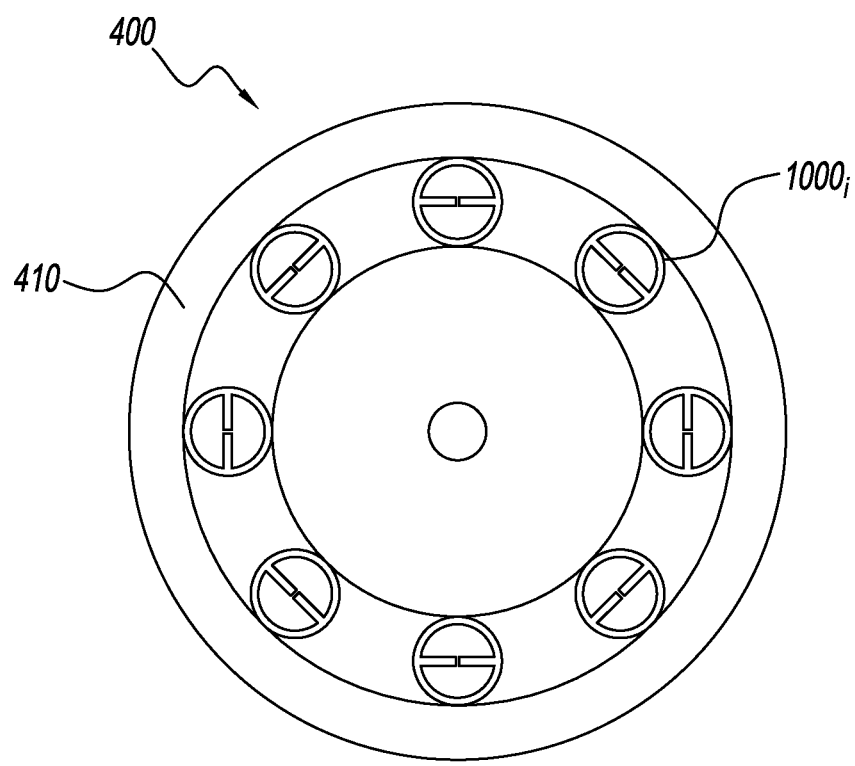
FIG. 10 schematically illustrates a frontal cut view of a wheel comprising peripherally distributed rotatable dampers, in accordance with some embodiments of the present invention.

A rotating damper of the present invention may be affixed to the rotating mass in a single location (such as its center), or several damping components may be distributed to several locations thereof. In FIG. 9, there is provided a rotating damper such as damper 2000, as a hub for wheel 300 having a tire 310. In FIG. 10 there is provided a second wheel 400 having tire 410, in which a plurality of dampers are affixed and evenly distributed adjacent its periphery. In the last example, very simple dampers may be used (such as a plurality of dampers 1000$_i$ each including two chambers) for damping only radial forces (when chambers are set to be radially opposing, as shown in FIG. 10), for damping only tangential forces (when chambers are set side-by-side), or for damping compound forces (when chambers are set anywhere in between the two positions above). Additionally or alternatively (not shown), opposing chambers are distributed across the wheel adjacent its periphery, thereby fluid is set to travel across the wheel from one side to the other during damping phenomenon. In some embodiments, several types of dampers may be used in a single rotating mass, that for example may be differentiated by number of chambers, way of fluid travel, radial vs. tangential force damping, etc.

The invention claimed is:

1. A rotatable mass fully rotatable around an axis of rotation and configured for self-damping a mechanical disturbance, the rotatable mass comprising inside thereof a device for damping the mechanical disturbance applied thereto, said damping device comprises:
    (a) a fully rotatable structure affixed to a single location in the rotatable mass and comprising an outer frame and an inner frame bound to rotate with said fully rotatable structure, wherein one of said outer frame or said inner frame is movable relative to the other in at least one axis, and wherein said outer frame and said inner frame are both rigid; and
    (b) a first chamber, disposed between said outer frame and said inner frame, containing a fluid and comprising a first opening in direct communication with a first constriction;
    wherein said first chamber is readily compressible between a portion of said outer frame and a portion of said inner frame when approached by the mechanical disturbance; and
    said first chamber, when compressed, is configured to expel at least partially said fluid through said first constriction, thereby damping the mechanical disturbance.

2. The rotatable mass of claim 1, wherein said at least one axis is said axis of rotation and/or a radial axis relative to said axis of rotation.

3. The rotatable mass of claim 1, wherein said outer frame, said inner frame, or both are at least partially circular.

4. The rotatable mass of claim 1 selected from the group consisting of: a wheel, a hub, a gear, a planetary revolving element, a rotor, a centrifuge, a driveshaft, a flywheel, a workpiece and a machining tool.

5. The rotatable mass of claim 1, wherein said first chamber is expandable, elastic and/or inflatable.

6. The rotatable mass of claim 1, wherein said portion of said outer frame comprises an inwardly projected rib and said portion of said inner frame comprises an outwardly projected rib.

7. The rotatable mass of claim 6, wherein each of said inwardly projected rib and said outwardly projected rib comprises a length smaller than a distance between two perpendicularly opposing points on said outer frame and said inner frame, respectively, when in concentric formation.

8. The rotatable mass of claim 6, wherein each of said inwardly projected rib and said outwardly projected rib comprises a second opening in direct communication with a second constriction.

9. The rotatable mass of claim 8, wherein at least one of said first constriction and said second constriction comprises a narrowing, an orifice, a nozzle, a bottleneck, a chokepoint, a valve, and combinations thereof.

10. The rotatable mass of claim 1 further comprising a second chamber in direct communication with said first opening.

11. The rotatable mass of claim 10, wherein said first and second chambers are configured to maintain a substantially constant volume when said fluid is not compressed.

12. A device for damping a mechanical disturbance applied to a rotatable mass, the damping device comprising:
(a) a fully rotatable structure affixable to a single location in the rotatable mass and comprising an outer frame and an inner frame bound to rotate with said fully rotatable structure, wherein one of said outer frame or said inner frame is movable relative to the other in at least one axis, and wherein said outer frame and said inner frame are both rigid; and
(b) a first chamber, disposed between said outer frame and said inner frame, containing a fluid and comprising a first opening in direct communication with a first constriction;
wherein said first chamber is readily compressible between a portion of said outer frame and a portion of said inner frame when approached by the mechanical disturbance; and
wherein said first chamber, when compressed, is configured to expel at least partially said fluid through said first constriction, thereby damping the mechanical disturbance.

13. The damping device of claim 12, wherein said at least one axis is said axis of rotation and/or a radial axis relative to said axis of rotation.

14. The damping device of claim 12, wherein said outer frame, said inner frame, or both are at least partially circular.

15. The damping device of claim 12, wherein the rotatable mass is selected from the group consisting of: a wheel, a hub, a gear, a planetary revolving element, a rotor, a centrifuge, a driveshaft, a flywheel, a workpiece and a machining tool.

16. The damping device of claim 12, wherein said first chamber is expandable, elastic and/or inflatable.

17. The damping device of claim 12, wherein said portion of said outer frame comprises an inwardly projected rib and said portion of said inner frame comprises an outwardly projected rib.

18. The damping device of claim 7, wherein each of said inwardly projected rib and said outwardly projected rib comprises a length smaller than a distance between two perpendicularly opposing points on said outer frame and said inner frame, respectively, when in concentric formation.

19. The damping device of claim 17, wherein each of said inwardly projected rib and said outwardly projected rib comprises a second opening in direct communication with a second constriction.

20. The damping device of claim 19, wherein at least one of said first constriction and said second constriction comprises a narrowing, an orifice, a nozzle, a bottleneck, a chokepoint, a valve, and combinations thereof.

21. The damping device of claim 12, further comprising a second chamber in direct communication with said first opening.

22. The damping device of claim 21, wherein said first and second chambers are configured to maintain a substantially constant volume when said fluid is not compressed.

* * * * *